(12) United States Patent
Peterson

(10) Patent No.: US 7,706,926 B2
(45) Date of Patent: Apr. 27, 2010

(54) ADAPTIVE FEEDBACK SOURCES FOR APPLICATION CONTROLLERS

(75) Inventor: John Peterson, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 137 days.

(21) Appl. No.: 11/928,291

(22) Filed: Oct. 30, 2007

(65) Prior Publication Data

US 2009/0112372 A1   Apr. 30, 2009

(51) Int. Cl.
| | |
|---|---|
| G05D 7/00 | (2006.01) |
| G05D 11/00 | (2006.01) |
| G05B 11/01 | (2006.01) |
| G06F 19/00 | (2006.01) |
| G01F 23/00 | (2006.01) |
| G01L 7/00 | (2006.01) |
| F17D 1/00 | (2006.01) |
| F17D 3/00 | (2006.01) |
| A01G 27/00 | (2006.01) |

(52) U.S. Cl. .................. 700/283; 700/17; 702/47; 702/50; 137/12; 137/14; 239/68

(58) Field of Classification Search ............ 700/17, 700/19, 275, 282–284; 702/45, 47, 50; 137/1, 137/2, 12, 14; 239/63, 67, 68, 398, 407; 417/43

See application file for complete search history.

(56) References Cited

U.S. PATENT DOCUMENTS

| | | | | |
|---|---|---|---|---|
| 5,295,790 A | * | 3/1994 | Bossart et al. ............ | 417/43 |
| 5,307,288 A | * | 4/1994 | Haines .................... | 702/47 |
| 5,704,546 A | * | 1/1998 | Henderson et al. ........ | 239/1 |
| 5,739,429 A | * | 4/1998 | Schmitkons et al. ...... | 73/196 |
| 6,055,851 A | * | 5/2000 | Tanaka et al. ............. | 73/46 |
| 6,149,071 A | * | 11/2000 | MacCallumMhor et al. .. | 239/67 |
| 6,286,412 B1 | * | 9/2001 | Manring et al. ........... | 91/433 |
| 6,330,806 B1 | * | 12/2001 | Beaverson et al. ........ | 62/201 |
| 6,383,389 B1 | * | 5/2002 | Pilgram et al. ........... | 210/614 |
| 6,532,809 B2 | * | 3/2003 | Robinson ................. | 73/114.45 |
| 6,592,741 B2 | * | 7/2003 | Nakanishi et al. ........ | 205/343 |
| 6,805,483 B2 | * | 10/2004 | Tomlinson et al. ........ | 374/144 |
| 6,886,639 B2 | * | 5/2005 | Arvidson et al. .......... | 169/14 |
| 6,950,725 B2 | * | 9/2005 | von Kannewurff et al. .. | 700/275 |

(Continued)

FOREIGN PATENT DOCUMENTS

JP   2002005075 A * 1/2002

(Continued)

OTHER PUBLICATIONS

International Search Report dated Feb. 12, 2009 for related PCT Application No. PCT/US2008/075228.

*Primary Examiner*—Crystal J Barnes-Bullock

(57) ABSTRACT

The present invention provides an advanced spray control system for controlling a sprayer, which comprises a controller, a plurality of sensors and feedback means, and an output means for controlling the application system of the sprayer. The controller receives inputs from the operator through a user interface, and/or various feedback signals from the sensors of the system (e.g., a flow meter, or a pressure transducer). After processing these inputs, the controller sends signals to other components of the sprayer, such as, the pump, the storage means, the boom sections, and/or the nozzles, to maintain or change their operating conditions. Also provided are a method of controlling a sprayer using the spray control system and a sprayer comprising the spray control system of the present invention.

10 Claims, 1 Drawing Sheet

U.S. PATENT DOCUMENTS

| | | |
|---|---|---|
| 6,950,728 B1 * | 9/2005 | Addink et al. .............. 700/284 |
| 7,266,426 B2 * | 9/2007 | Maturana et al. ............ 700/282 |
| 7,272,452 B2 * | 9/2007 | Coogan et al. ................ 700/19 |
| 2004/0260429 A1 | 12/2004 | Saelens |
| 2008/0078389 A1 * | 4/2008 | Xiao et al. ............. 128/204.22 |
| 2008/0251600 A1 * | 10/2008 | Sorensen et al. .............. 239/63 |
| 2008/0295839 A1 * | 12/2008 | Habashi ................. 128/204.22 |

FOREIGN PATENT DOCUMENTS

| | | |
|---|---|---|
| JP | 2003088783 | 3/2003 |

\* cited by examiner

ADAPTIVE FEEDBACK SOURCES FOR APPLICATION CONTROLLERS

BACKGROUND OF THE INVENTION

1. Field of the Invention

The present invention relates generally to novel spray control methods and systems for controlling a sprayer, particularly, an agricultural sprayer.

2. Description of Related Art

Sprayers are widely used in agriculture and horticulture for applying chemicals (e.g., insecticides and fungicides) or fertilizers to crops, to protect the crops from diseases, insects, and to facilitate the growth and harvest of the crops.

Most agriculture/horticulture sprayers are designed to be mounted on or towed by a vehicle on the ground, or carried by airplanes or helicopters. These sprayers typically include one or more storage or supply vessels, a left and a right boom or other manifold systems that carry a plurality of geometrically arranged spaced nozzles along its length, a pump for pressurizing and distributing the fluid through pipes or hoses to spray nozzles, and means to control the pump, boom, and spray nozzles.

Currently, two basic categories of feedback controls are used for controlling the function of sprayers: (i) flow volume-based closed loop control system, and (ii) pressure-based closed loop control system. Flow volume-based feedback system measures the flow volume of the substance exiting the machine and feeds this signal back to a controller to control the performance of the machine. Pressure-based feedback system monitors the system pressure, calculates the flow volume using the pressure data, and feeds the information back to a controller to control the performance of the sprayer.

Each of the control systems has its strengths and weaknesses. However, the sprayers and application controllers known in the art only allow one of these control methods to be used for controlling the machines, with the exception of a small number of sprayers and application controllers that allow a second feedback system for monitoring purposes only.

In order to improve the performance of a sprayer, it is therefore desirable to provide a spray control system for controlling sprayers that allows both manual (the operator of the sprayer) or automatic (the controller) control of the spray system to select a feedback control system, or to switch back and forth between the two above-mentioned feedback control systems, based on the needs of the operation or operation conditions.

BRIEF SUMMARY OF THE INVENTION

The present invention relates to an advanced spray control system, which includes a controller providing the spray control system or the operator of the sprayer the flexibility of utilizing a flow volume-based closed loop control system, a pressure-based closed loop control system, or both of these closed loop control systems, to control the performance of a sprayer.

In one aspect, the spray control system of the present invention comprises a controller, a plurality of sensors and feedback means, and an output means for controlling the application system of the sprayer. The controller may receive inputs from the operator through a user interface, and/or various feedback signals from the sensors of the system (e.g., a flow meter, or a pressure transducer). After processing these inputs, the controller may send signals to other components of the sprayer, such as, the pump, the storage means, the boom sections, and/or the nozzles, to maintain or change their operating conditions. In one embodiment, the controller of the present invention may override the choice of the operator in the selection of the feedback control method, for example, where the operating limits of the selected feedback source have been exceeded, or where the selected feedback source has failed (e.g., due to a component failure).

Also provided are methods of improving the performance of sprayers, and sprayers comprising the spray control system of the present invention.

Other features and advantages of the present invention will become apparent from the following detailed description. It should be understood, however, that the detailed description and the specific examples, while indicating the preferred embodiments of the present invention, are given by way of illustration only, since various changes and modifications within the spirit and scope of the present invention will become apparent to those skilled in the art from this detailed description.

DETAILED DESCRIPTION OF PREFERRED EMBODIMENTS

Figure 1:
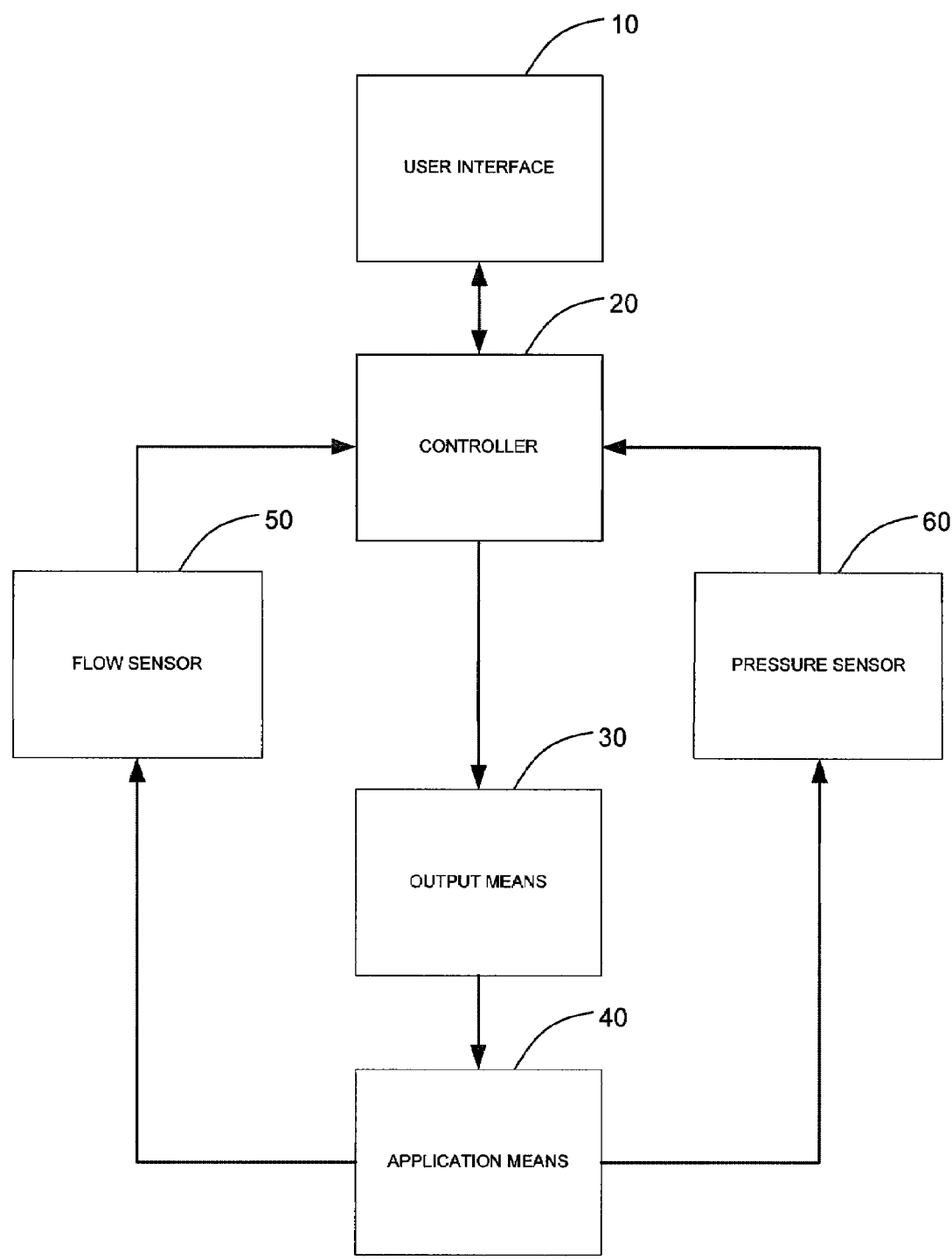
FIG. 1 shows a schematic representation of a spray control system in accordance with a preferred embodiment of the present invention.

As used herein and in the appended claims, the singular forms "a," "an," and "the" include plural references, unless the content clearly dictates otherwise. Thus, for example, reference to "a sensor" includes a plurality of such sensors and equivalents thereof known to those skilled in the art, and reference to "the controller" is a reference to one or more such controllers and equivalents thereof known to those skilled in the art, and so forth. All publications, patent applications, patents, and other references mentioned herein are incorporated by reference in their entirety.

The present invention relates generally to methods and systems for controlling the performance of sprayers, which offer the flexibility of controlling the performance of sprayers utilizing feedback signals from both flow sensors and pressure transducers, or switching to a second feedback control system where the designated feedback control system has failed. In various embodiments of the present invention, the spray system may perform a continuous calibration by running both flow-based and pressure-based feedback controlling systems. Under these circumstances, because the system is constantly in a relative state of calibration, switching back and forth between feedback sources does not impact the accuracy of the rate at which a substance of interest is applied.

In one aspect, the spray control system of the present invention may include, without limitation, a controller, a plurality of sensors and feedback means, and an output means for controlling the application system of the sprayer. The controller may receive inputs from the operator through a user interface, and/or various feedback signals from the sensors of the system (e.g., a flow meter, or a pressure transducer). After processing these inputs, the controller may send signals to other components of the sprayer, such as, the pump, the storage means, the boom sections, and/or the nozzles, to maintain or change their operating conditions. In various embodiments of the present invention, the controller may override the choice of the operator in the selection of the feedback control method, for example, where the operating limits of the selected feedback source have been exceeded, or where the selected feedback source has failed (e.g., due to a component failure).

FIG. 1 shows a representative schematic representation of a spray control system in accordance with one embodiment of the present invention. Controller 20 may receive inputs/instructions from user interface 10, as well as from flow sensor 50 and/or pressure transducer 60. Controller 20 may be a computational device comprising a programmable means, a calculation means, a memory, and/or combinations thereof. Controllers and user interfaces suitable for the purposes of the present invention are known in the art. For example, a user interface may include, without limitation, a LCD panel, a touch screen, a keypad, or a scrolling device.

The application means 40, which may include, without limitation, a storage system, a dispensing system (e.g., a pump, a spray nozzle, and various control valves), may be programmed and calibrated by an operator of the sprayer using user interface 10, controller 20, and output means 30. The application means 40 may be further calibrated and controlled by controller 20 that utilizes feedback signals from flow sensor 50 and/or pressure transducer 60. In one embodiment, the operator of the sprayer through user interface 10 may instruct the spray control system to use one or both feedback signals. The operator may also set various operating limits for the selected feedback source using user interface 10. In various embodiments of the present invention, controller 20 may switch to the other feedback control system when the operating limits of the selected feedback source have been exceeded, or when the selected feedback source has failed (e.g., without limitation, component failure and broken wire).

Both flow sensor 50 and pressure transducer 60 are operatively linked to controller 20 and application means 40. The sensors monitor the performance of application means 40 and send the performance data to controller 20. Flow sensors and pressure transducers suitable for the purposes of the present invention are well known in the art.

Whereas this invention has been described in detail with particular reference to preferred embodiments, it is understood that variations and modifications can be effected within the spirit and scope of the invention, as described herein before and as defined in the appended claims. The corresponding structures, materials, acts, and equivalents of all means plus function elements, if any, in the claims below are intended to include any structure, material, or acts for performing the functions in combination with other claimed elements as specifically claimed.

I claim:

1. A sprayer comprising a controller, an output means, a flow sensor, a pressure transducer, and an application means, wherein:

the flow sensor and the pressure transducer are operatively linked to the controller and the application means;

the controller is operatively linked to the application means through an output means; and the controller receives input from at least one of the flow sensor and the pressure transducer and sends operating instruction to the application means using the output means;

wherein the controller can determine the flow rate using input from the flow sensor and the pressure transducer simultaneously;

wherein the controller switches the source of input from the pressure transducer to the flow sensor when there is a failure of the pressure transducer; and wherein the controller switches the source of input from the pressure transducer to the flow sensor when the input from the pressure transducer exceeds a pre-determined threshold.

2. The sprayer of claim 1, wherein the controller receives inputs from both the flow sensor and the pressure transducer.

3. The sprayer of claim 1, further comprising a user interface means operatively linked to the controller.

4. The sprayer of claim 1, wherein the sprayer is a multi-section boom sprayer.

5. A method for controlling a sprayer comprising an application means, comprising operatively connecting a spray control system to the sprayer, wherein:

the spray control system comprises a controller, an output means, a flow sensor, and a pressure transducer;

the flow sensor and the pressure transducer are operatively linked to the controller and the application means;

the controller is operatively linked to the application means through the output means; and the controller receives input from at least one of the flow sensor and the pressure transducer and sends operating instruction to the application means using the output means;

wherein the controller can determine the flow rate using input from the flow sensor and the pressure transducer simultaneously;

wherein the controller switches the source of input from the pressure transducer to the flow sensor when there is a failure of the pressure transducer; and wherein the controller switches the source of input from the pressure transducer to the flow sensor when the input from the pressure transducer exceeds a pre-determined threshold.

6. The method of claim 5, wherein the controller receives inputs from both the flow sensor and the pressure transducer.

7. The method of claim 5, wherein the controller switches the source of input from the flow sensor to the pressure transducer, based on the meeting of a pre-determined condition.

8. The method of claim 7, wherein the pre-determined condition is a failure of the flow sensor or the input from the flow sensor exceeding a pre-determined threshold.

9. The method of claim 5, further comprising a user interface means operatively linked to the controller.

10. The method of claim 5, wherein the sprayer is a multi-section boom sprayer.

* * * * *